(12) United States Patent
Hong et al.

(10) Patent No.: US 7,394,987 B2
(45) Date of Patent: Jul. 1, 2008

(54) PROGRAMMABLE INFRARED DATA PROCESSOR

(75) Inventors: William Hong, Austin, TX (US); Glenn Reinhardt, Austin, TX (US); Antonio Torrini, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 460 days.

(21) Appl. No.: 11/273,699

(22) Filed: Nov. 14, 2005

(65) Prior Publication Data

US 2007/0110446 A1     May 17, 2007

(51) Int. Cl.
*H04B 10/00* (2006.01)
(52) U.S. Cl. .............. 398/106; 398/107; 398/128; 398/135; 398/138
(58) Field of Classification Search ............ 398/106, 398/107, 128, 135, 136, 138, 202; 348/734
See application file for complete search history.

(56) References Cited

U.S. PATENT DOCUMENTS 6,111,677 A * 8/2000 Shintani et al. ............ 398/126
6,400,480 B1 * 6/2002 Thomas .................... 398/106

* cited by examiner

*Primary Examiner*—Dalzid Singh
(74) *Attorney, Agent, or Firm*—Garlick Harrison & Markison; Timothy W. Markison

(57) ABSTRACT

An Infrared (IR) receiver includes a programmable decoder having a normal mode of operation and a proprietary mode of operation. When the programmable decoder is in the normal mode of operation, the programmable decoder decodes frames of an IR data transmission to produce decoded data. When the programmable decoder is in the proprietary mode of operation, the programmable decoder passes data of the IR data transmission during a time out period to produce raw data. The IR receiver also includes a pulse detection circuit that generates a pulse detection signal in response to detecting the IR data transmission. The IR receiver further includes a timer circuit that generates the timeout period in response to the pulse detection signal.

17 Claims, 9 Drawing Sheets

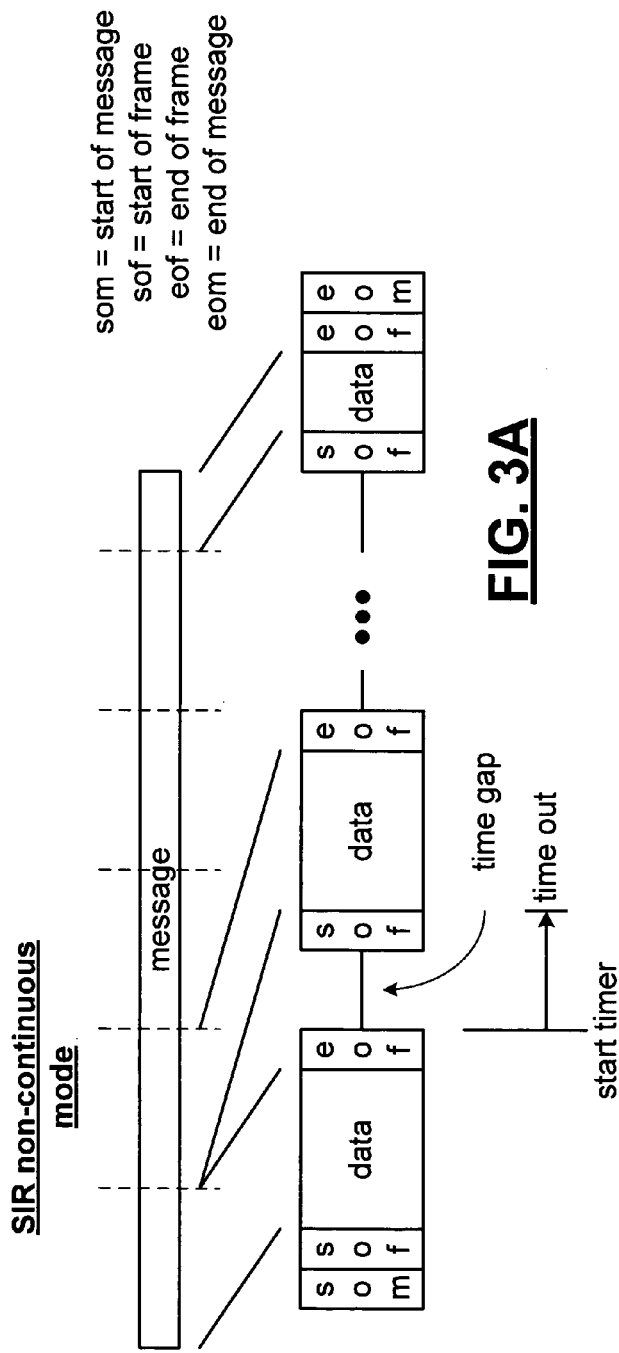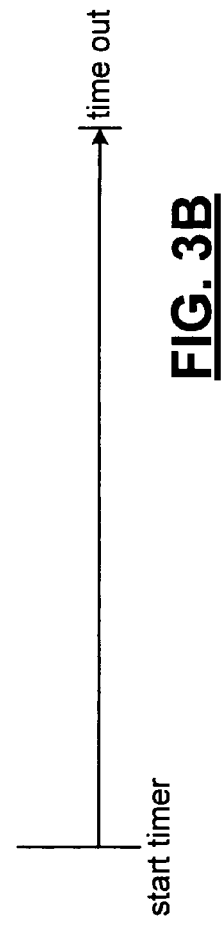

PROGRAMMABLE INFRARED DATA PROCESSOR

BACKGROUND OF THE INVENTION

1. Technical Field of the Invention

This invention relates generally to infrared (IR) communication systems and more particularly to programmable IR data processors in such IR communications systems.

2. Description of the Related Art

IR systems are known to include IR devices, which are in communication via IR communication paths. Each IR device includes an IR controller and an IR transceiver that includes a light generating diode and a light receiving diode. IR devices conduct point-to-point communication by sending and/or receiving infrared light pulses between IR transceivers.

The IR communication typically conforms to an IR standard protocol. Some IR standard protocols are provided by the Infrared Data Association ("IrDA"). IrDA defines standard protocols for IR physical layer communications in a specification titled "IrDA Physical Layer Specification v. 1.4," published May 30, 2001. Other IrDA specifications are available at www.irda.org.

The IrDA physical layer specification is intended to facilitate the point-to-point communication between electronic devices (e.g., computers and peripherals) using directed half duplex serial infrared communications links through free space. IrDA defined four kinds of infrared links to support different data rates. Included in these links are Slow Infrared (SIR) supporting speeds up to 115.2 Kbps, Medium Infrared (MIR) supporting 0.576 Mbps and 1.152 Mbps data rates, Fast Infrared (FIR) supporting a 4.0 Mbps data rate, and Very Fast Infrared (VFIR) supporting 16.0 Mbps. Any utilization of the SIR, MIR, FIR or VFIR data transmission modes in this specification is referred to herein as "normal mode".

The IrDA schemes in the normal mode utilize framing and the framing format varies from mode to mode. An IrDA frame typically includes a start of frame indication, an end of frame indication and data therebetween. For SIR mode, its frame format begins with one start bit (logic 0) followed by 8 data bits and optional parity bit(s), and ends with one or more stop bits. This format is an asynchronous format, because only one byte of data is transmitted/received in one frame. In contrast, the MIR, FIR, and VFIR format is a continuous format, in which there is no gap between frames. This provides for a continuous transmission, for which most IR transceivers are designed.

In at least some implementations of a standard SIR mode, a frame of data is received and then there is a gap of time before the next frame is received. This time gap is a problem for IR receivers that are designed for the continuous data flow of MIR, FIR, and/or VFIR, since they expect a continuous stream of data (i.e., one frame right after the other). To such IR receivers, the time gap of an SIR transmission is viewed as a transmission error.

Additionally, many IR devices are designed to comply with an industry standard mode of IR transmission. However, as with any standard, there are compromises to ensure general compatibility between devices. Such compromises include the overhead of framing and encoding in a normal mode. However, this framing overhead may slow data transmission from one device to another for certain applications and uses. In such applications and uses, a nonstandard, or "proprietary mode" may preferably be used between compatible devices.

Therefore, a need exists for a method and apparatus for a programmable infrared data processor without the above-referenced limitations.

BRIEF SUMMARY OF THE INVENTION

The programmable infrared data processor meets these needs and others. In one embodiment, a pulse detection circuit produces a pulse detection signal in response to detecting reception of an IR frame. A programmable decoder, when enabled, decodes the IR frame in accordance with programmable IR decoding parameters to produce decoded data. In normal mode, a control unit enables the programmable decoder in response to the pulse detection signal. When the control unit detects an end of frame (EoF), the programmable decoder is temporarily suspended. A time out period is initiated in response to the EoF. The control unit determines whether a pulse detection signal is received for a next IR frame prior to expiration of a time out period. When the pulse detection signal is received for the next IR frame prior to expiration of the time out period, the programmable decoder is enabled to decode the next IR frame.

In another embodiment, an IR controller includes a programmable decoder, when enabled, to decode an IR frame in accordance with programmable IR decoding parameters to produce decoded data. The IR controller further includes a control unit. When the IR controller is in a normal mode the control unit enables the programmable decoder to decode the IR frame while the IR frame is being received. The control unit, when in the normal mode, also temporarily disables the programmable decoder after the IR frame has been received. Further, when in the normal mode, the control unit determines whether another IR frame is received prior to expiration of a time out period. When another IR frame is received prior to expiration of the time out period, the control unit enables the programmable decoder to decode the another IR frame. When the IR controller is in a proprietary mode, the programmable decoder is enabled to pass the IR frame for a duration of a proprietary time out period to produce raw data.

In another embodiment, an IR receiver includes a programmable decoder having a normal mode of operation and a proprietary mode of operation. When the programmable decoder is in the normal mode of operation, the programmable decoder decodes frames of an IR data transmission to produce decoded data. When the programmable decoder is in the proprietary mode of operation, the programmable decoder passes data of the IR data transmission during a time out period to produce raw data. The IR receiver further includes a timer circuit that generates the timeout period in response to the pulse detection signal.

BRIEF DESCRIPTION OF THE SEVERAL VIEWS OF THE DRAWING(S)

FIG. 3A illustrates a diagram of a message in a SIR non-continuous normal mode in accordance with the present invention;

FIG. 3B illustrates a diagram of a message in a proprietary mode in accordance with the present invention;

DETAILED DESCRIPTION OF THE INVENTION

Figure 1:
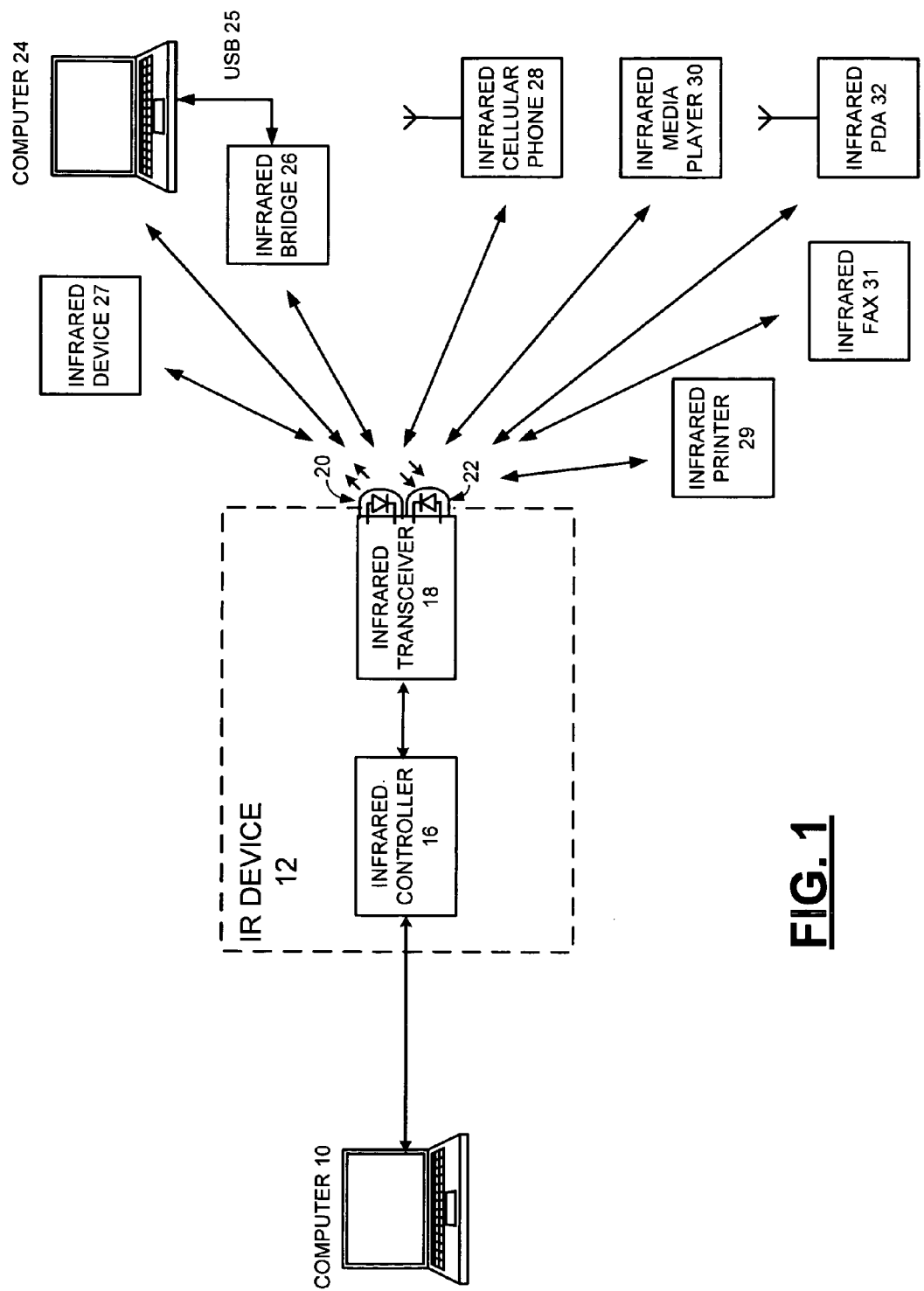
FIG. 1 illustrates a schematic block diagram of a computer and infrared (IR) device in accordance with the present invention.

FIG. 1 illustrates a schematic block diagram of a computer 10 operably coupled to IR device 12. IR device 12 operably couples computer 10 via an IR communication path to a computer 24, to an IR bridge 26, to an IR device 27, to an IR cellular phone 28, to an IR fax machine, to an IR printer 29, to an IR media device 30, and/or to an IR personal digital assistant (PDA). IR bridge 26 may have circuitry similar to IR device 12, for providing computer 24 with an IR communication conduit. IR bridge 26 may be operably coupled to computer 24 via a USB port. IR device 27 may be any device having an IR communication capability. As one of ordinary skill in the art would appreciate, the computers 10 and 24 include more circuitry than shown in FIG. 1, however, such additional circuitry is not germane to the present invention thus, for the sake of clarity, the additional circuitry has been omitted. Also, as would be apparent to one of ordinary skill in the art, IR device 12 may be coupled to devices other than computer 10, such as a media player, cellular phone, printer, scanner, PDA, etc., for the purpose of providing an IR communications path to another device such as a computing device, a communications device and/or a peripheral device.

IR device 12 may be operably coupled to computer 10 over a data bus (e.g., via a Universal Serial Bus (USB) data port). IR device 12 may be an internal component of computer 10 or it may be a self-contained external peripheral component. The IR device 12 includes an IR controller 16 and an IR transceiver 18.

IR transceiver 18 includes a light transmitting diode 20 and a light receiving diode 22. IR transceiver 18 may communicate with IR controller 16 according to the IrDA serial interface for transceiver control specification ("serial interface"). The IrDA serial interface specification is hereby incorporated by reference, and may be found at www.irda.org. It should be appreciated that other interfaces for communicating between the transceiver 18 and controller 16 are available, but are not discussed here because they are not germane to the present invention.

The IR controller 16 acts as a data bridge between a central processing unit (CPU) of computer 10 and IR transceiver 18. In this regard, IR controller 16 may perform at least one of a plurality of transmit/receive functions in accordance with one or more data transfer modes. Such transmit/receive functions include, but are not limited to, modulation and demodulation, encoding/decoding, CRC generation/checking, bit and character stuffing, preamble generation, start and stop bit generation, framing, synchronization for higher data rates, and/or data buffering, and/or passing raw data. The data transfer modes of operation include, but are not limited to, a normal mode of operation and a proprietary mode of operation.

The normal mode of operation may be a continuous data mode or a non-continuous data mode. For instance, normal continuous data modes include medium IR (MIR), fast IR (FIR), and very fast IR (VFIR), as in the IrDA specification, while a normal non-continuous data mode includes at least some implementations of slow IR (SIR). In the normal mode of operation, IR controller 16 may perform modulation, encoding, CRC generation, bit and character stuffing, preamble, start and stop bit generation, framing, synchronization for higher data rates, and/or data buffering in accordance with an IrDA data transfer protocol.

The proprietary mode of operation is a data transmission mode that passes a substantially continuous stream of a known amount of raw data. The proprietary data stream transmission may be of a predetermined length for the proprietary mode of operation, or the length may be negotiated between IR devices. Optionally, the proprietary data stream transmission comprises a proprietary beginning of frame data word, which may indicate the length of the raw data and the raw data. An IR data transmission in a proprietary mode of operation may use pulse position modulation (like the IrDA physical layer specification) or other modulation schemes such as RZI, HHH (1,13), amplitude shift keying, pulse code modulation, etc.

Figure 2:
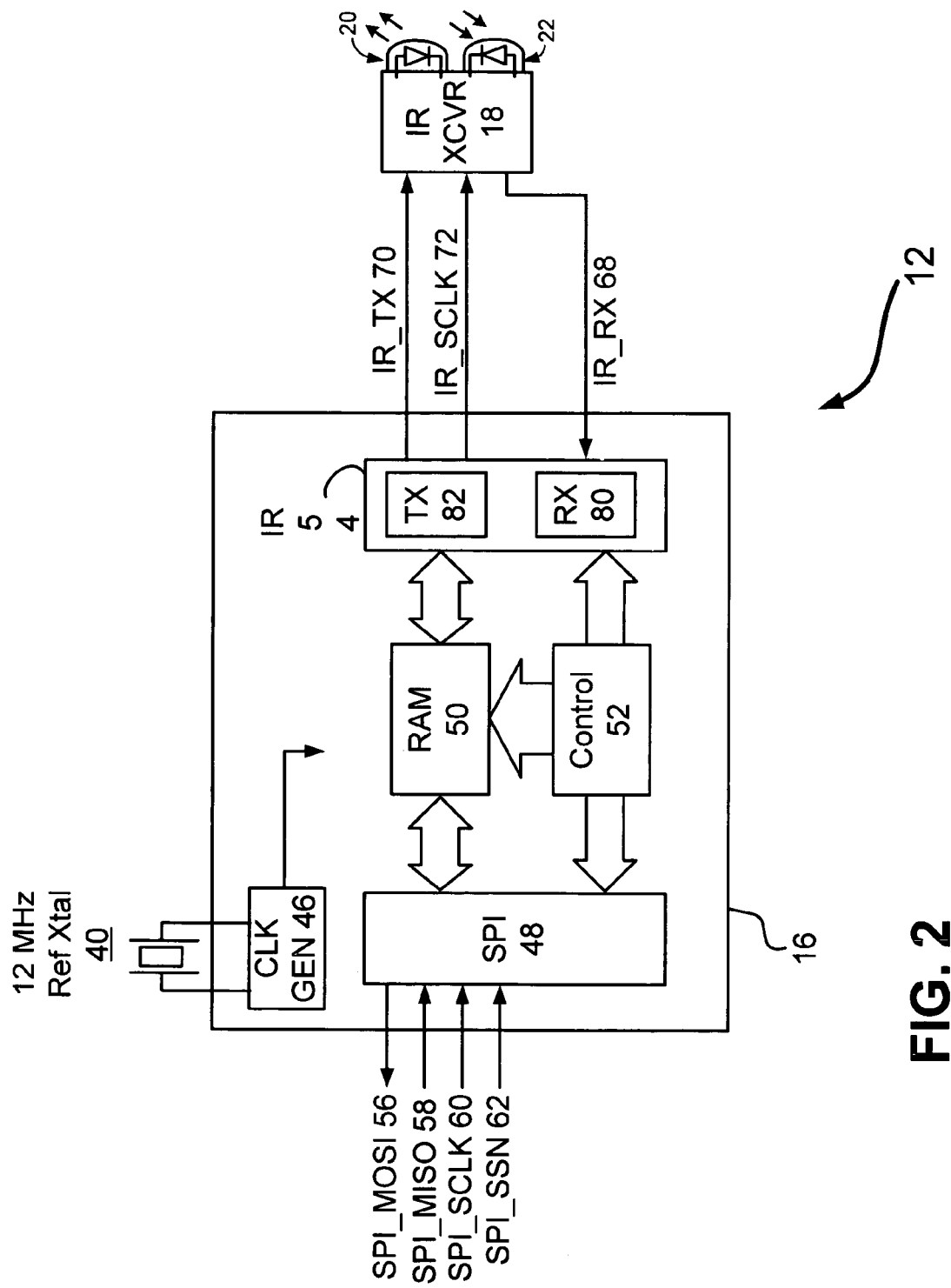
FIG. 2 illustrates a schematic block diagram of an IR device in accordance with the present invention.

FIG. 2 illustrates a schematic block diagram of IR device 12 in accordance with the present invention. IR device 12 includes IR controller 16 and IR transceiver 18. IR controller 16 includes clock generation circuitry (CLK GEN) 46, Serial Peripheral Interface (SPI) 48, RAM 50, control logic 52, and IR module 54. IR transceiver 18 includes light transmitting diode 20 and light receiving diode 22. IR module 54 includes an IR receive module 80 and an IR transmit module 82. IR receive module 80 includes circuitry to receive electrical pulses from IR transceiver 18 over IR_RX 68 line. IR transmit module 82 includes circuitry to transmit electrical pulses to IR transceiver 18 over IR_TX 70 line. External crystal 40 is coupled to CLK GEN 46. Serial Peripheral Interface (SPI) 48 includes a bidirectional data bus coupled to computer 10 of FIG. 1, with separate serial input and output lines: SPI_MOSI 56 is the serial data in line; SPI_MISO 58 is the serial data out line; SPI_SCLK 60 is the serial clock in line; and SPI_SSN 62 is the slave select line.

The IR controller 16 may support one or more of the IrDA data transfer protocols in normal mode, for example, serial IR (SIR), medium IR (MIR), fast IR (FIR), and very fast IR (VFIR). IR controller 16 may also support a proprietary protocol. IR controller 16 may provide SPI 48 as a fast synchronous bit serial interface to computer 10. SPI 48 may support a sustained transfer rate of greater than 16 Mb/sec to meet the requirements of the VFIR transfer rates.

Accordingly, IR controller 16 is configured as a SPI slave to the computer 10. This is achieved by asserting a slave signal on the SPI_SSN 62 line (e.g., active low signal). Data may be received from computer 10 to SPI 48 by driving the SPI_SCLK 60 and SPI_MOSI 56 signals. For receiving data, the IR controller 16 will capture the incoming SPI_MOSI 56 using the positive edge of SPI_SCLK 60. For sending data, the current bit is driven out on SPI_MISO 58 and changed on the falling edge of SPI_SCLK 60. The clock signal on SPI_SCLK 60 may be driven by computer 10.

CLK GEN 46 functions to produce one or more system clocks for the IR controller 16. To achieve this, a reference clock of approximately 12 MHz is produced from external crystal 40. A phase locked loop (PLL) may then convert the reference clock into a desired clock by multiplying the clock signal to 240 MHz, then sending the PLL output clock to a divider circuit, where the clock signals are divided to provide one or more system clocks needed by the different blocks, in accordance with their clock speed requirements.

In order to sustain required transfer rates for the aforementioned transmission protocols, the IR controller 16 has memory 50. Memory 50 may provide a set of memory buffers for intermediate storage of data frames. Memory 50 may provide four receive buffers and two transmit buffers. The memory 50 may be a single memory device or a plurality of memory devices. Such a memory device may be a read-only memory, random access memory, volatile memory, non-volatile memory, static memory, dynamic memory, flash memory, cache memory, and/or any device that stores digital information.

The control logic 52 keeps track of the buffer status and controls data flow between memory 50, SPI 48, and the IR module 54. The control logic 52 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Note that when the control logic 52 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Further note that, the memory 50 may store, and the control logic 52 may execute, operational instructions corresponding to at least some of the steps and/or functions illustrated in FIGS. 1 to 9.

The IR module 54 manages the low level framing involved with IrDA physical layer communications when in a normal mode of operation and also the passage of raw data when in a proprietary mode of operation. In accordance with the present invention, and as will be described in greater detail in the descriptions accompanying later figures, IR module 54 is capable of operating in a normal mode of operation that decodes frames and in a proprietary mode of operation that passes raw data.

FIG. 3A illustrates a diagram of transmitting a message in a SIR non-continuous mode in accordance with the present invention. In the IrDA SIR mode, the message is cut up into smaller sections. Each section is transmitted as data in a frame. Each frame may also include overhead, such as a Start of Frame (SoF) indicator, and an End of Frame (EoF) indicator. Additional overhead occurs at the start of the message with a Start of Message (SoM) indicator and an End of Message (EoM) indicator.

As may be seen from FIG. 3A, in the SIR non-continuous mode there is a time gap between frames. Decoders that are designed to decode continuous data, for example in the MIR, FIR, and VFIR modes, frequently have trouble decoding the SIR non-continuous mode because a time gap is viewed as a transmission error.

An aspect of the present invention solves this problem for decoding data in the non-continuous SIR mode, by temporarily disabling the programmable decoder between frame receptions. For example, when the programmable decoder is operating in the non-continuous SIR mode, a timer is started when an end of frame is detected and the programmable decoder is temporarily suspended for a timeout period. When a new frame is detected prior to the expiration of the timeout period, the programmable decoder is enabled. When the timeout period expires prior to detection of a new frame, the programmable decoder is suspended and an error message is generated.

FIG. 3B illustrates a diagram of transmitting a message in a proprietary mode in accordance with the present invention. Generally, the message in the proprietary mode carries raw data (i.e., data that has not been framed, encoded, or otherwise processed for an IR transmission). Accordingly, the message in the proprietary mode does not carry overhead data, such as SoF, EoF, etc. The message in the proprietary mode may also be broken into sections for transmission.

Before commencing communications in the proprietary mode, there may be a negotiation between IR devices that sets parameters, such as when to start the timer, a data rate, and a timeout period. Each message (or message section) will have a negotiated timeout period.

In the proprietary mode, a timer starts when the initial pulse of the proprietary data stream is detected. While the timer is active (i.e., before time out), the receiver receives the data transmission and treats the data as valid.

Figure 4:
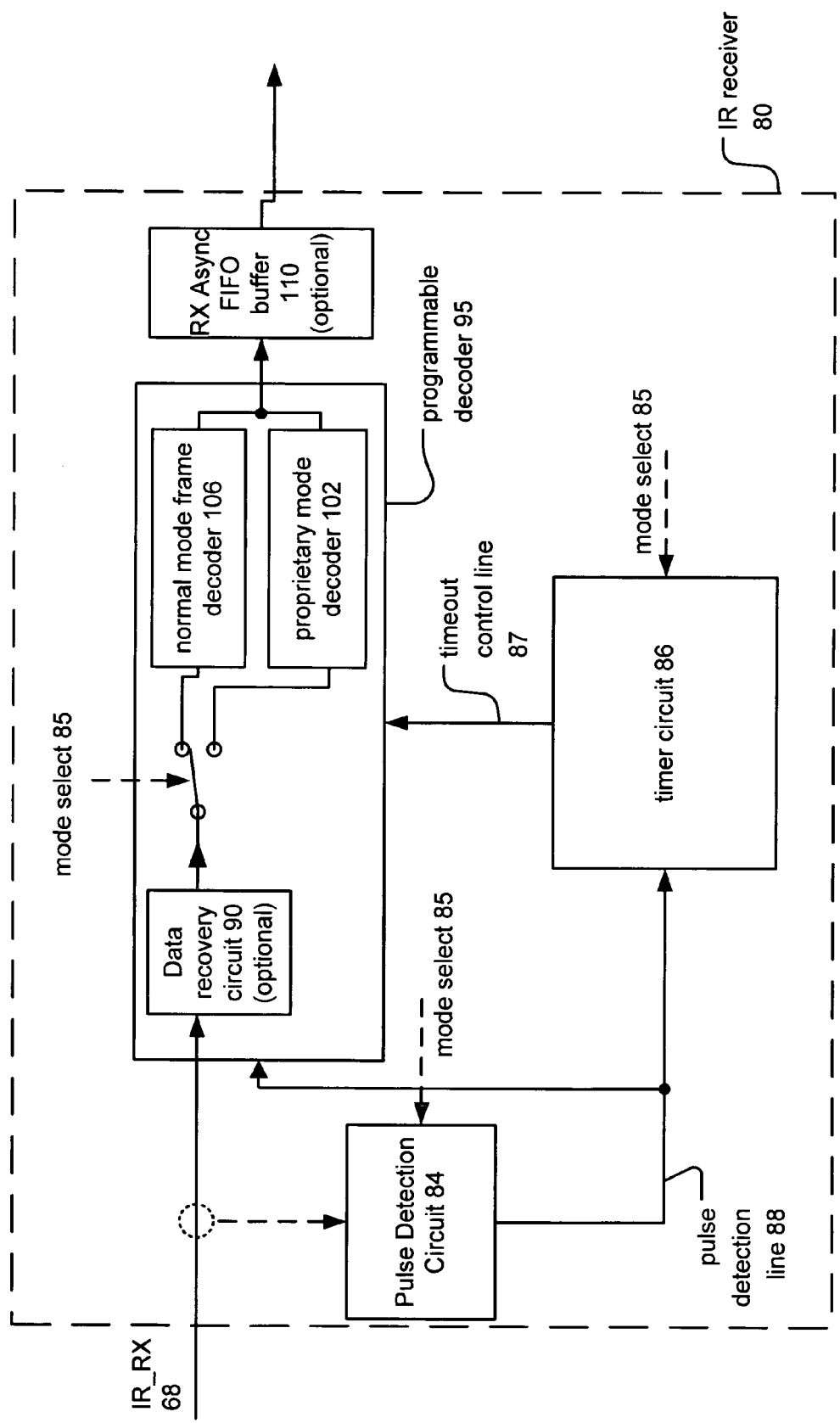
FIG. 4 illustrates a schematic block diagram of an embodiment of an IR receiver module in accordance with the present invention.

FIG. 4 illustrates a schematic block diagram of an embodiment of the IR receiver 80 in accordance with the present invention. As may be seen from FIG. 4, IR receiver 80 includes line IR_RX 68 for receiving an electrical asynchronous signal, a programmable decoder 95, a pulse detection circuit 84, and a timer circuit 86. IR receiver may also optionally include a buffer, labeled as RX async FIFO buffer 110. Programmable decoder 95 may include a normal mode frame decoder module 106, a proprietary mode decoder module 102, and optionally, a data recovery circuit module 90. Pulse detection circuit 84 is operably coupled to timer circuit 86 and programmable decoder 95 via pulse detection line 88. Timer circuit 86 is operably coupled to programmable decoder 95 via timeout control line 87. Although not shown in this figure, incoming data on line IR_RX 68 may optionally be buffered by a buffer prior to being processed by proprietary mode decoder 102 or normal mode frame decoder 106.

In operation, when mode select 85 selects a normal mode of operation, then IR data is decoded by normal mode frame decoder 106 in accordance with the communication protocol. If mode select 85 selects a proprietary mode of operation, then the IR data is processed by the proprietary mode decoder 102.

In the normal and proprietary modes, the incoming data pulses may be optionally captured by data recovery circuit 90 to retrieve the data out of the data stream on IR_RX 68. Data recovery circuit 90 may optionally detect the communication protocol of the incoming data by determining the incoming data rate (SIR, MIR, FIR, VFIR, or proprietary protocol) and set mode select 85 accordingly. Alternatively, mode select 85 may be set manually.

In the SIR non continuous mode, pulse detection circuit 84 detects a Start of Frame (SoF) of an IR data transmission on the IR_RX line 68. In response to detecting the SoF, pulse detection circuit 84 generates and sends a pulse detection signal over pulse detection line 88. Pulse detection signal enables the normal mode frame decoder 106 in programmable decoder 95 to decode the incoming frame in accordance with programmable IR decoding parameters to produce decoded data. Note that the incoming IR data may optionally be buffered prior to being decoded. Further note that programmable decoder 95 may be enabled while the data is being received.

In the SIR non continuous mode, the timer circuit 86 is used in determining a time gap between frames to facilitate suspension of decoding during the time gap between frames.

The timer starts on the reception of an End of Frame (EoF). Accordingly, in response to the pulse detection circuit 84 detecting an EoF, the pulse detection signal is provided by pulse detection circuit 84 over pulse detection line 88 to timer circuit 86 and programmable decoder 95. The pulse detection signal causes programmable decoder 95 to temporarily suspend decoding and also causes a timer to start in timer circuit 86. The pulse detection circuit 84 detects whether a SoF is received for a next frame. When the SoF is received prior to the expiration of the timeout period, a signal is sent on pulse detection line 88 to enable the programmable decoder 95, and resume decoding. On detecting an EoF, the pulse detection circuit 84 also determines if a End of Message (EoM) is present, indicating that the present frame is the last frame in the IR transmission. If an EoM is detected, the programmable decoder 95 is suspended after decoding the frame. When an EoM is not detected and the SoF is not received before the timeout, timer circuit 86 sends a timeout signal to programmable decoder 95, causing the decoding to stop and an error to be indicated.

In the proprietary mode, when the start of a proprietary data stream is received, a timer is started when a pulse of the transmission is initially detected. While the timer is active (i.e., before time out), the receiver receives the data transmission and treats the data as valid. Note that in the proprietary mode, the timer circuit 86 is used to detect the end of a proprietary data transmission.

Responsive to pulse detection circuit 84 detecting an incoming proprietary IR transmission, timer circuit 86 starts a timer and proprietary mode decoder 102 is enabled to decode the proprietary data in accordance with negotiated parameters. The negotiated parameters may be negotiated between IR devices that support a proprietary mode of transmission. These negotiated proprietary IR transmission parameters may, for example, include a start time for a time out period parameter, a data rate parameter, a duration for the time out period parameter, and/or a decoding convention parameter.

The start time for a time out period parameter defines the triggering event for starting the timeout timer. For example, the timeout timer may commence timing from the start of receiving the proprietary data stream, or it may commence timing after a negotiated time.

The data rate parameter defines the rate of communication between the IR devices. This rate may be of a rate similar to those according to the normal mode, or a different rate altogether.

The duration for the time out period parameter defines the period between the commencement of the timeout time starting and the generation of the timeout control signal. Accordingly, the timeout time is a function of the data rate and the length of the proprietary data stream.

The decoding convention parameter defines the decoding convention to be used in decoding the proprietary data stream. Examples of decoding conventions that may be used include, but are not limited to, SIR, MIR, FIR, VFIR, and no decoding. The decoding convention may produce raw data by passing undecoded data of the IR frame without decoding and/or deframing.

Note that the negotiation of parameters for operating in the proprietary mode may occur while operating in a normal mode (e.g., SIR mode, etc.). Once the parameters are negotiated and set in both IR devices, mode select 85 may select the proprietary mode of operation. Once the IR devices have established the negotiated parameters, the appropriate clocks are set.

Proprietary decoder 102 may optionally perform other decoding features on a proprietary mode data stream such as error checking, encryption, and so on, and should not be limited by the description herein.

It should be noted that a typical IR receiver is designed to receive faster IR modes, such as MIR, FIR and VFIR. Accordingly, the system clock that is available is much faster than is needed for SIR. Instead of slowing the system clock in SIR mode, the higher clock rate from the available system clocks may be used, such that the SIR data is oversampled. This facilitates the ability to accommodate the timing gaps, since the higher clock rate enables each bit of an SIR transmission to be sampled multiple times, thus insuring that the start bit will be detected when the decoder is activated. If the system clock were adjusted to the rate of the SIR data, the start bit may be missed and the decoder may not properly decode the data.

After processing by programmable decoder 95, data is optionally provided to RX async FIFO buffer 110 for transmission to computer 10.

Figure 5:
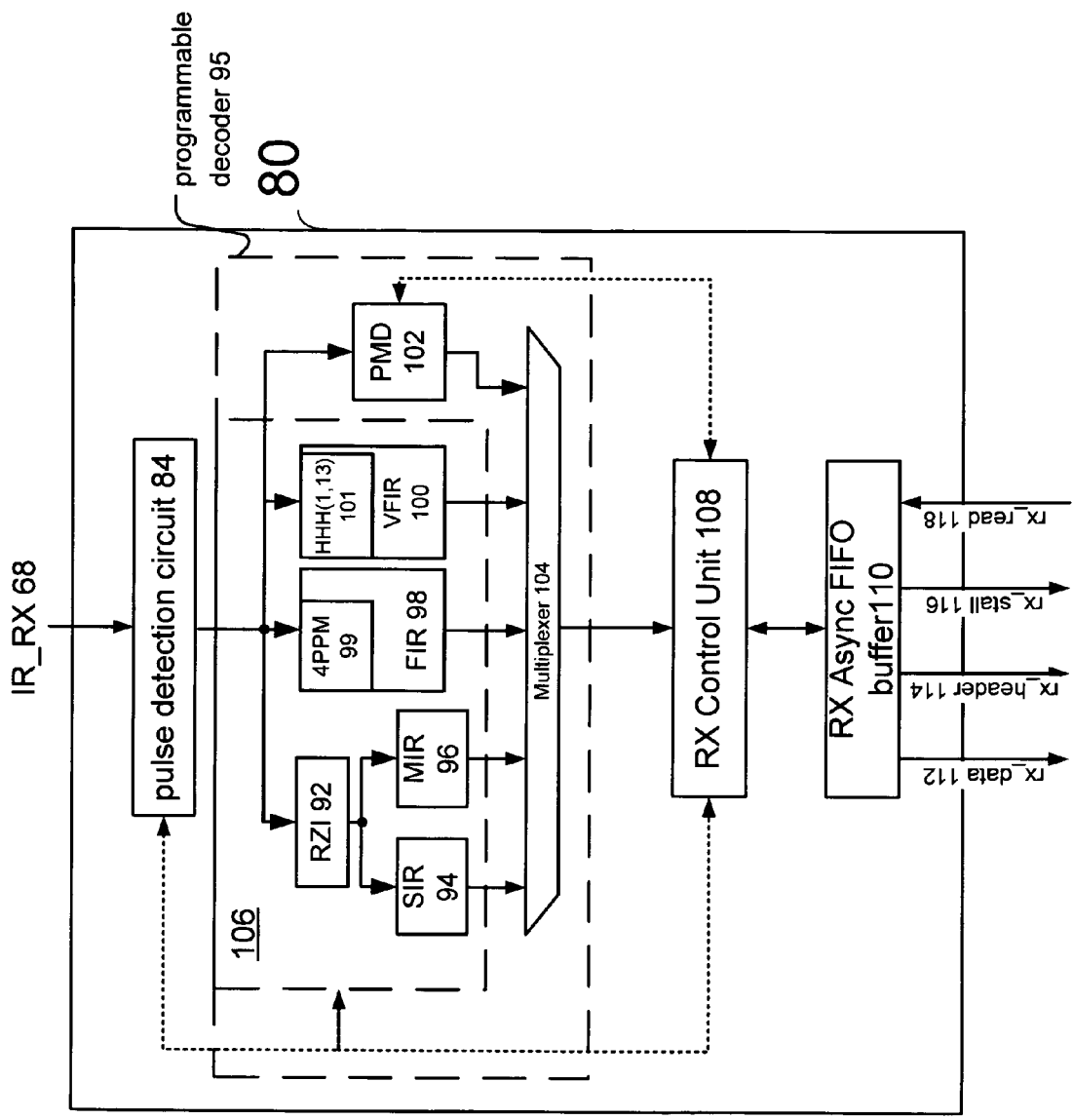
FIG. 5 illustrates a schematic block diagram of another embodiment of the IR receiver module in accordance with the present invention.

FIG. 5 illustrates a schematic block diagram of another embodiment of the IR receiver module 80 in accordance with the present invention. IR receive module 80 includes RX async FIFO 110, RX control unit 108, programmable decoder 95, and pulse detection circuit 84. Pulse detection circuit 84 is coupled to line IR_RX 68 for receiving an electrical asynchronous signal. Programmable decoder 95 includes normal mode frame decoder 106 and proprietary mode decoder (PMD) 102, and multiplexer 104. Normal mode frame decoder 106 includes the following demodulation blocks: RZI 92, 4PPM 99, and HHH(1,13) 101. RX Async FIFO 110 includes input and output lines including rx_data 112, rx_header 114, rx_stall 116, and rx_read 118. The elements are operably coupled as shown in FIG. 5.

Normal mode frame decoder 106 includes the following decoding blocks: SIR RX block 94, MIR RX block 96, FIR RX block 98, and VFIR RX block 100. SIR RX block 94 is capable of processing IrDA frames at 2400 bps, 9600 bps, 19.2 kbps, 38.4 kbps, 57.6 kbps and 115.2 kbps. In accordance with the IrDA physical layer specification, SIR RX block 94 may strip a number of extra SoFs in the frame header, escapes appropriate bytes in a frame and check a CRC and a remove EoF bit(s). MIR RX block 96 is capable of processing IrDA frames at 576 kbps and 1.152 Mbps. In accordance with the IrDA physical layer specification, MIR RX block 96 may strip start and stop flags, and check a CRC. FIR RX block 98 is capable of processing IrDA frames at 4 Mbps. In accordance with the IrDA physical layer specification, FIR RX block 98 may strip a preamble, start and stop flags and check a CRC. FIR RX block 98 may also decode the data in 4PPM format via 4PPM block 99. VFIR RX block 100 is capable of processing IrDA frames at 16 Mbps. In accordance with the IrDA physical layer specification, the VFIR TX block 100 may strip a preamble, start and stop flags, check a CRC, strip a Flush Byte and a NULL sequence into a transmitted frame. It may also decode scrambling on the frame data. VFIR RX block 100 may decode the data in HHH(1,13) format via HHH(1,13) block 137.

Proprietary mode decoder (PMD) 102 may process non-IrDA frame structures and/or continuous data streams of a predetermined or negotiated length. RX control unit 108 may selectively enable or disable most data processing operations that are performed on frames or a continuous data stream. Accordingly, RX control unit 108 may selectively enable and disable PMD 102 operations for checking CRC, stripping framing data, decoding, and so on. One possible application of this, for example, is for receiving a continuous raw data stream where there is no framing or encoding/decoding of data.

In operating in the non-continuous SIR (normal) mode, in response to a Start of Frame (SoF) being detected on IR_RX line 68 by pulse detection circuit (PDC) 84, a pulse detection signal is generated and sent to RX control unit 108. RX control unit 108 receives the pulse detection signal, and in response, enables the programmable decoder 95.

Programmable decoder 95, when enabled, decodes the frame in accordance with programmable IR decoding parameters to produce decoded data. The IR decoding parameters may optionally include framing convention, data rate, and decoding convention. The normal mode frame decoder 106 processes SIR, MIR, FIR and VFIR frame modes and speeds, in accordance with the IrDA physical layer and framing specifications. Proprietary mode decoder (PMD) 102 processes a proprietary protocol.

When an End of Frame (EoF) is detected by PDC 84, RX control unit 108 temporarily disables the programmable decoder 95. Also, when an EoF is detected, RX control unit 108 initiates a time out period by starting a timer. RX control unit 108 determines whether a pulse detection signal is received from PDC 84 for a next IR frame prior to expiration of a time out period. When the pulse detection signal is received for the next IR frame prior to expiration of the time out period, the programmable decoder 95 is enabled to decode the next IR frame.

After detecting an EoF, PDC 84 also determines if a End of Message (EoM) is present, indicating that the present frame is the last frame in the IR transmission. If an EoM is detected, the programmable decoder 95 is suspended after decoding the frame. When an EoM is not detected and the SoF is not received before the timeout, timer circuit 86 sends a timeout signal to programmable decoder 95, causing the decoding to stop and an error to be indicated.

The decoded data may then be buffered by RX async FIFO 110. Writing to RX async FIFO 110 will place the data in preparation of being transmitted to the computer 10. rx_data 112 provides an output 8-bit byte of received data. rx_header 114 provides a 1-bit output signal indicating rx_data is frame header information. rx_stall 116 provides a 1-bit output signal that the IR receive module 80 currently has no data available. Rx_read 118 provides a 1-bit input signal to read the next byte of data from the IR receive module 82. Whenever the IR receive module 80 is not driving rx_stall 116, it means there is data available in the RX async FIFO buffer 110.

The RX control unit 108 may optionally detect a mode of operation. For example, RX control unit 108 may determine that the incoming data stream is data in SIR, MIR, FIR, VFIR, or a proprietary protocol. Accordingly, the appropriate decoder may be used for decoding the data stream.

In operating in a proprietary mode of operation, PDC 84 detects reception of an incoming proprietary mode data stream. A pulse detection signal is then sent to RX control unit 108. RX control unit 108 may start a timeout period in accordance with negotiated proprietary IR transmission parameters, and enable the proprietary mode decoder (PMD) 102 in programmable decoder 95 for the timeout period. In the proprietary mode, data that is received prior to expiration of the timeout period is treated as being valid.

The negotiated proprietary IR transmission parameters may include a start time for the time out period, a data rate, a duration of the timeout period, and a decoding convention. These negotiated parameters may be of a variety of permutations and combinations. For example, raw data may be passed by PMD 102 by setting the decoding convention parameters to pass data of the IR frame without decoding or deframing.

After being processed by PMD 102, the data may be buffered by RX async FIFO buffer 110, which is operably coupled to computer 10.

Figure 6:
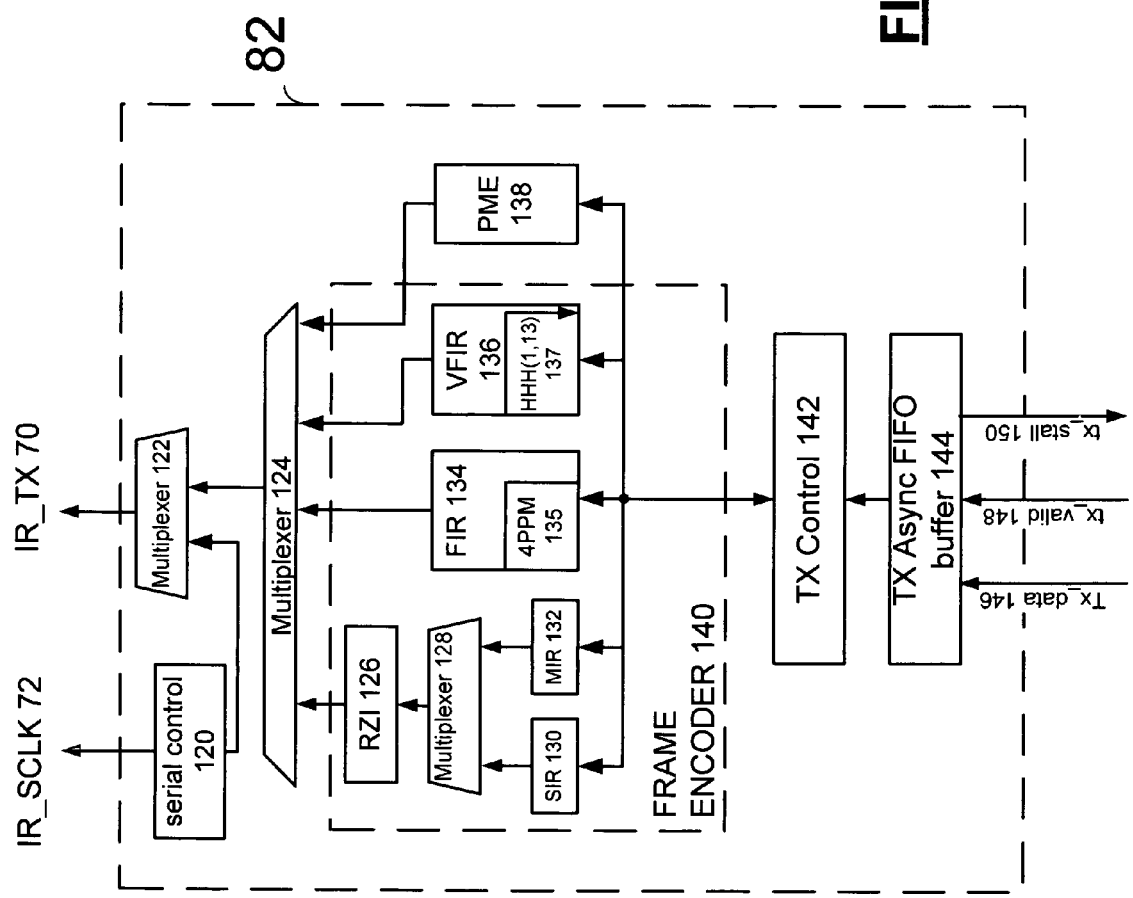
FIG. 6 illustrates a schematic block diagram of an IR transmit module in accordance with the present invention.

FIG. 6 illustrates a schematic block diagram of IR transmit module 82 in accordance with the present invention. IR transmit module 82 includes TX async FIFO 144, TX control 142, frame encoder 140, serial control 120, and multiplexer 122. TX Control 142 includes circuitry to control the IR transmit module 82.

TX Async FIFO 144 includes two input lines Tx_data 146 and Tx_valid 148, and an output line Tx_stall 150. TX Async FIFO 144 provides a buffer for data to be processed by frame encoder 140 and proprietary mode encoder (PME) 138. Tx_data 146 provides TX Async FIFO 144 with an input for 8-bit bytes of transmit data. Writing data to this location places the data in the TX asynch FIFO 144, buffered for transmission. Tx_valid 148 provides a 1 bit input to IR transmit module 82 indicating that tx_data 146 is valid. Tx_stall 150 provides a 1-bit output to indicate IR transmit module 82 cannot accept any data while asserted.

When in a normal mode of operation, the frame encoder 140 may process SIR, MIR, FIR and VFIR frame modes and speeds, in accordance with the IrDA physical layer and framing specifications. When in a proprietary mode of operation, proprietary mode encoder 138 may process a proprietary protocol for transmission.

SIR TX block 130 is capable of processing IrDA frames at 2400 bps, 9600 bps, 19.2 kbps, 38.4 kbps, 57.6 kbps and 115.2 kbps. In accordance with the IrDA physical layer specification, SIR TX block 130 inserts a number of extra beginning of frame bits (BOFs) specified in the frame header, escapes appropriate bytes in a frame and inserts a CRC and a EOF.

MIR TX block 132 is capable of processing IrDA frames at 576 kbps and 1.152 Mbps. In accordance with the IrDA physical layer specification, MIR encoder 132 may insert start and stop flags, a CRC, and escapes appropriate bits in a frame. The outputs from SIR TX block 130 and MIR TX block 132 are coupled to return-to-zero-inverted (RZI) modulation block 126 via multiplexer 128.

FIR TX block 134 is capable of processing IrDA frames at 4 Mbps. In accordance with the IrDA physical layer specification, FIR TX block 134 may insert a preamble, start and stop flags and a CRC. FIR TX block 134 may also encode the data in 4PPM format via 4PPM block 135.

VFIR TX block 136 is capable of processing IrDA frames at 16 Mbps. In accordance with the IrDA physical layer specification, the VFIR TX block 136 may insert a preamble, start and stop flags, a CRC, a Flush Byte and a NULL sequence into a transmitted frame. It may also perform scrambling on the frame data. VFIR TX block 136 may encode the data in HHH(1,13) format via HHH(1,13) block 137.

PME block 138 is capable of processing non-IrDA frame structures. TX control 142 can selectively enable or disable most operations that are performed on frames or continuous data streams in accordance with the proprietary mode. Accordingly, TX control 142 may enable and disable PME block 138 operations for generating CRC, framing data, encoding, and so on. One possible application of this, for example, is transmitting raw data.

The outputs from RZI block 126, FIR TX block 134, VFIR TX block 136 and PME block 138 are inputs to multiplexer 124, which is operatively coupled to multiplexer 122. Serial control 120 provides a clock signal IR_SCLK 72. The bits from multiplexer 122 are driven out on IR_TX 70 and the data is clocked using IR_SCLK 72.

Figure 7A:
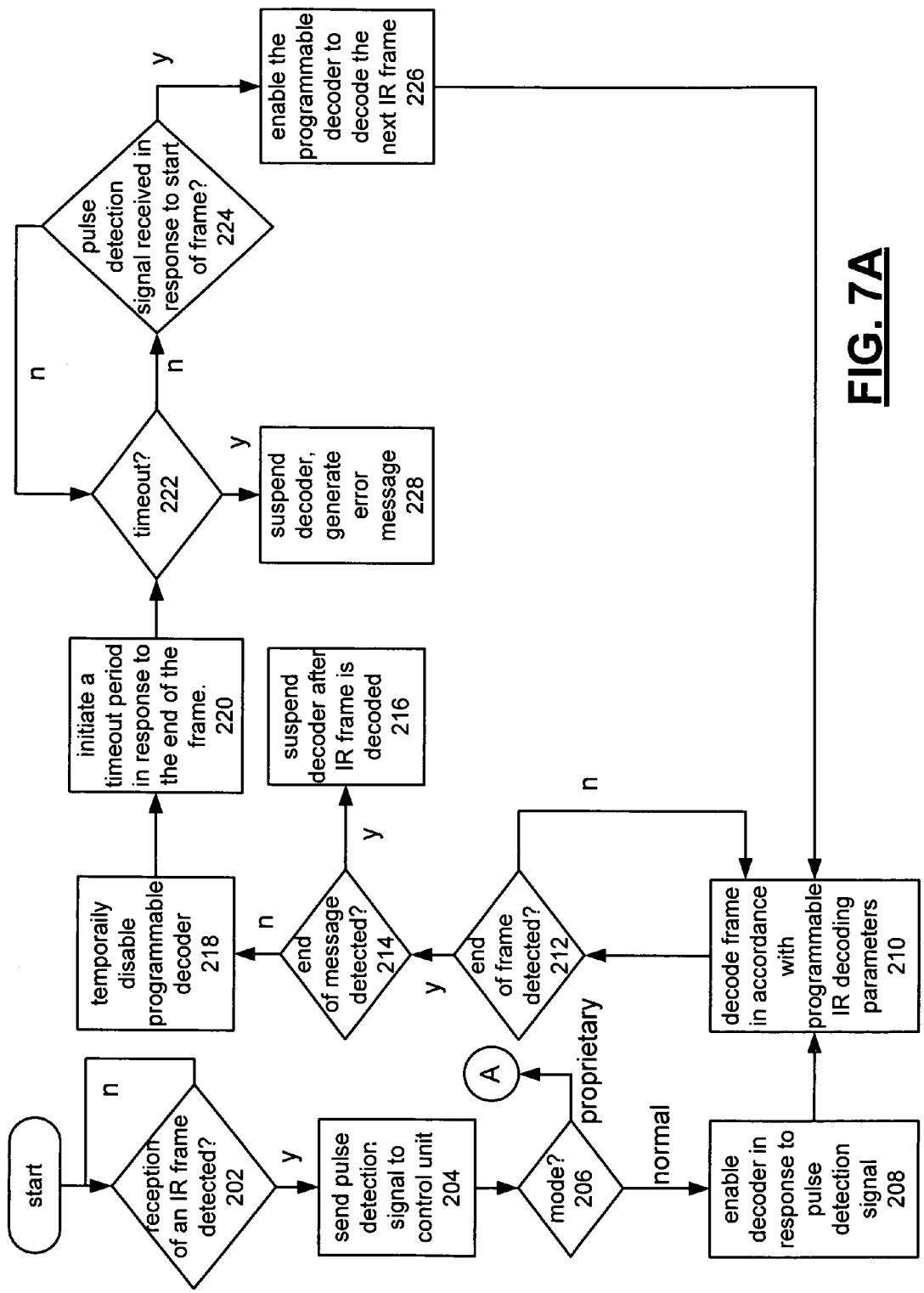
FIG. 7A illustrates a logic diagram for receiving an IR data transmission in the normal mode of operation in accordance with the present invention.

FIG. 7A illustrates a logic diagram for receiving an IR data transmission in the normal mode of operation. The process begins at step 202 when reception of an IR frame is detected. On detection of an IR frame, a pulse detection signal is generated and sent to control unit at step 204. Next, the mode of operation is determined at step 206.

When operating in a normal mode of operation, the decoder, in response to pulse detection signal, is enabled (in normal mode) at step 208. Next, the IR frame is decoded in accordance with programmable IR decoding parameters at step 210. After detecting an End of Frame (EoF) at step 212, and not detecting an End of Message (EoM) at step 214, the programmable decoder is temporarily disabled at step 218 and a timeout period is initiated in response to the EoF at step 220. When a pulse detection signal is received in response to a Start of Frame (SoF) from the next frame (step 224) before the timeout period expires (step 222), the programmable decoder is enabled to decode the next IR frame at step 226. When the timeout period expires (step 222) before a pulse detection signal is received, the programmable decoder is suspended and an error message is generated at step 228.

Referring back to step 212, when an EoF is detected and an EoM is detected at step 214, the end of the message has been received. Accordingly, the programmable decoder is suspended after the IR frame is decoded at step 216.

Figure 7B:
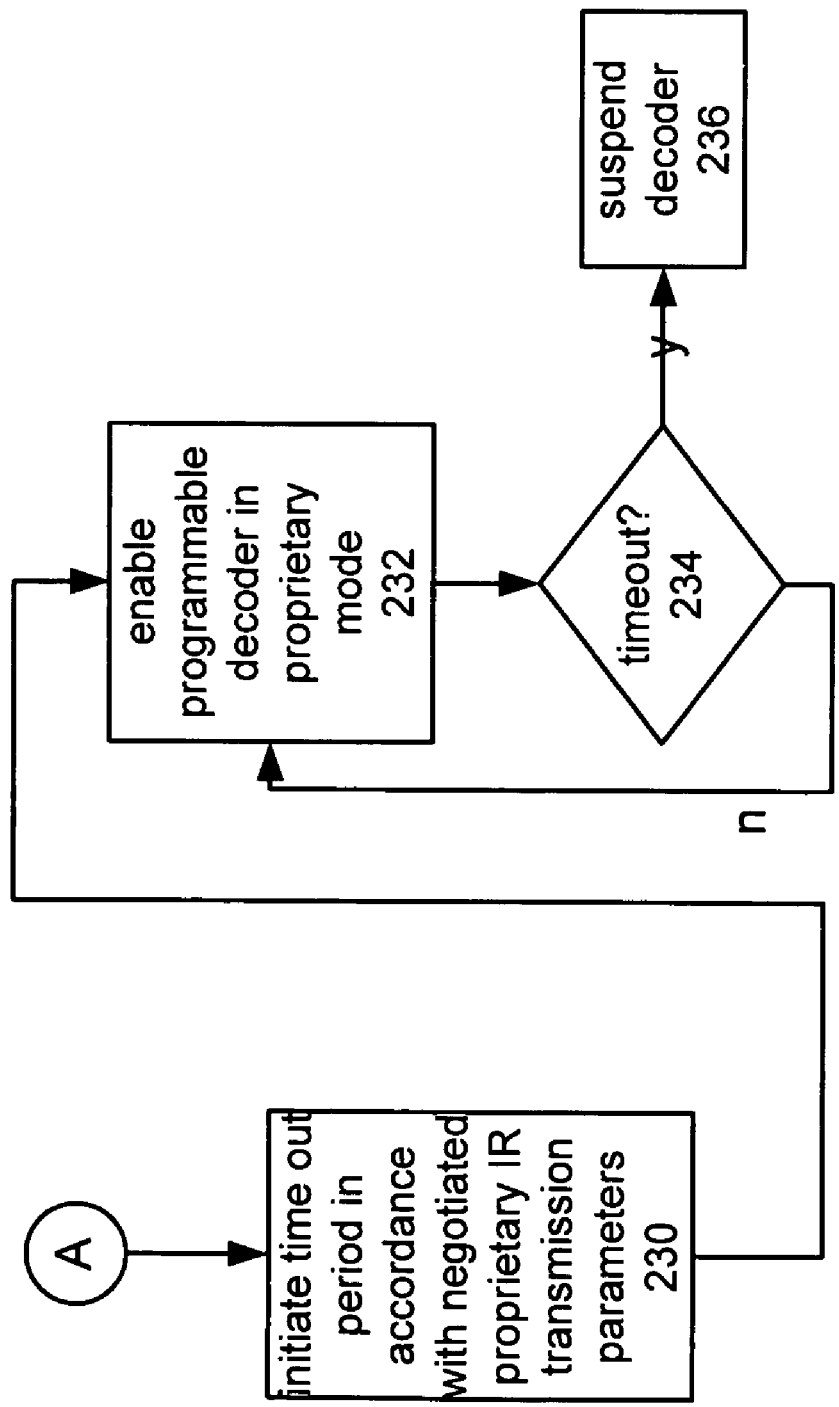
FIG. 7B illustrates a logic diagram for receiving an IR data transmission in the proprietary mode of operation in accordance with the present invention.

FIG. 7B illustrates a logic diagram for receiving an IR data transmission in the proprietary mode of operation. The process begins at step 202 (of FIG. 7A) when reception of an IR frame is detected. On detection of an IR frame, a pulse detection signal is generated and sent to control unit at step 204 (of FIG. 7A). Next, the mode of operation is determined at step 206 (of FIG. 7A).

When operating in a proprietary mode of operation, then the timeout period is initiated (timer starts) in accordance with negotiated proprietary IR transmission parameters at step 230. The programmable decoder is enabled in the proprietary mode at step 232. Data that is decoded in accordance with negotiated proprietary IR transmission parameters prior to the expiration of timeout period 234 is treated as valid. On expiration of the timeout period, the programmable decoder is suspended at step 236.

Figure 8:
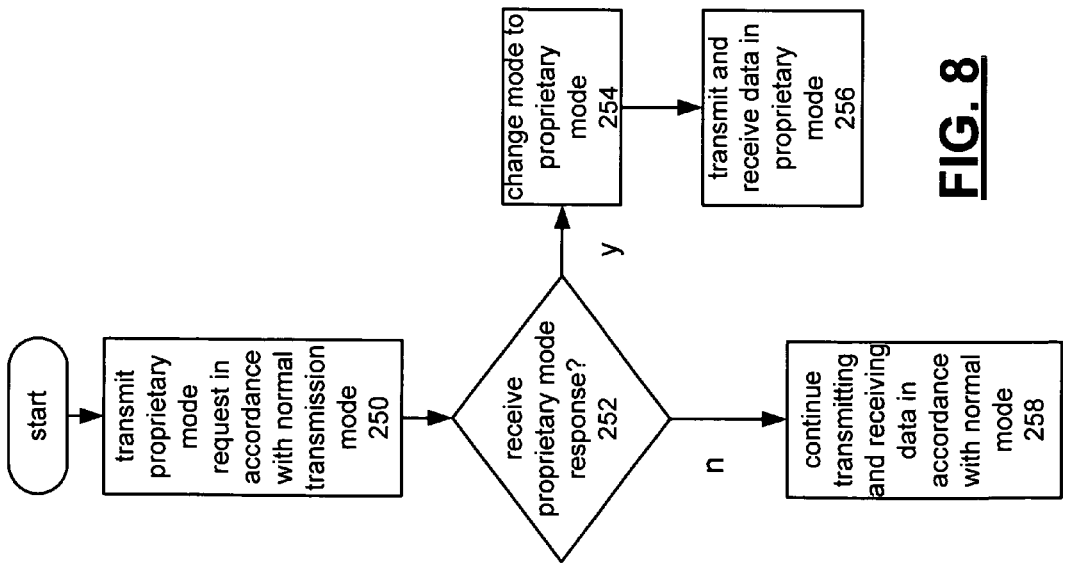
FIG. 8 illustrates a logic diagram of a method for negotiating a mode change between a first IR device and a second IR device from a normal mode of operation to a proprietary mode of operation in accordance with the present invention.

FIG. 8 illustrates a logic diagram of a method for negotiating a mode change between a first IR device and a second IR device from a normal mode of operation to a proprietary mode of operation. The process begins at step 250, where a proprietary mode request formatted in accordance with a normal mode is transmitted from a first IR device to a second IR device.

The process proceeds by detecting a proprietary mode response at step 252. If a proprietary mode response is received at the first IR device, then this response causes the first IR device to change to a proprietary mode at step 254. Optionally, the first IR device may send a confirmation signal to the second IR device (not shown). Next, the first IR device may transmit and receive data in the proprietary mode, at step 256. If a proprietary mode response is not received, then the IR devices may continue transmitting and receiving IR data in accordance with the normal mode of operation.

Figure 9:
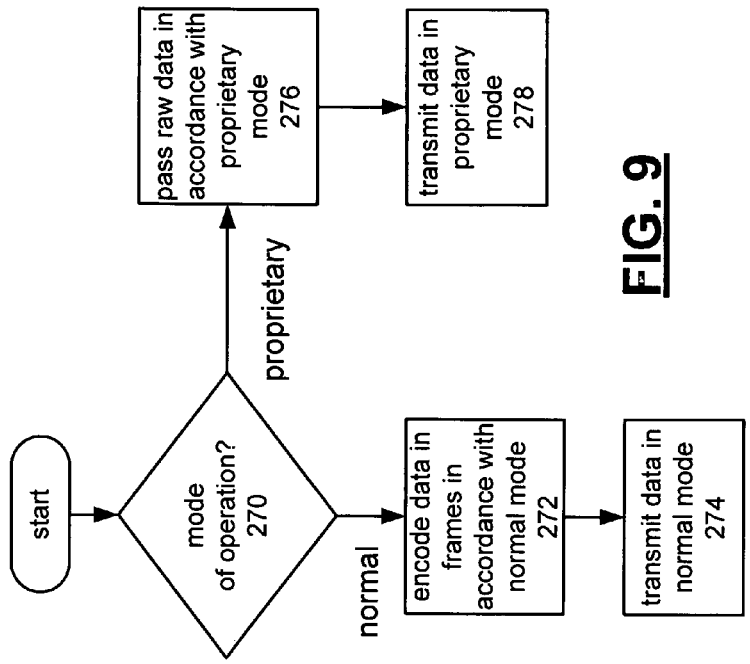
FIG. 9 illustrates a logic diagram of a method for transmitting an IR data transmission in accordance with the present invention.

FIG. 9 illustrates a logic diagram of a method for transmitting an IR data transmission. First, a mode of operation is determined at step 270. If a normal mode of operation is detected, then at step 272, data is encoded in frames in accordance with the normal mode of operation. Data is then transmitted in the normal mode, at step 274.

When a proprietary mode of operation is detected, then at step 276, raw data is passed and/or processed in accordance with the proprietary mode of operation. Data is then transmitted in the proprietary mode, at step 278.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

Any disclosed embodiment may be combined with one or several of the other embodiments shown and/or described. This is also possible for one or more features of the embodiments. The steps herein described and claimed do not need to be executed in the given order. The steps can be carried out, at least to a certain extent, in any other order.

What is claimed is:

1. An infrared (IR) controller comprises:
   a pulse detection circuit operably coupled to produce a pulse detection signal in response to detecting reception of an IR frame;
   a programmable decoder operably coupled to, when enabled, decode the IR frame in accordance with programmable IR decoding parameters to produce decoded data; and
   a control unit operably coupled to, when the IR controller is in a normal mode:
      enable the programmable decoder in response to the pulse detection signal;
      detect an end of frame of the IR frame;
      when the end of frame is detected, temporarily disable the programmable decoder;
      initiate a time out period in response to the end of frame;
      determine whether a pulse detection signal is received for a next IR frame prior to expiration of a time out period; and
      when the pulse detection signal is received for the next IR frame prior to expiration of the time out period, enable the programmable decoder to decode the next IR frame.

2. The IR controller of claim 1, wherein the programmable IR decoding parameters comprises at least one of:
   framing convention;
   data rate; and
   decoding convention.

3. The IR controller of claim 1, wherein the control unit further functions to:
   detect a mode of operation;
   when the mode of operation is a proprietary mode:
      start a time out period in accordance with negotiated proprietary IR transmission parameters; and enable the programmable decoder for the time out period.

4. The IR controller of claim 3, wherein the negotiated proprietary IR transmission parameters comprise at least two of:
   start time for the time out period;
   data rate;
   duration of the time out period; and
   decoding convention.

5. The IR controller of claim 4, wherein the decoding convention comprises:
   passing undecoded data of the IR frame to produce raw data.

6. The IR controller of claim 5 further comprises:
   a buffer for storing the decoded data in accordance with a data rate of the programmable IR decoding parameters when the IR controller is in the normal mode and for storing the raw data when the IR controller is in the proprietary mode.

7. The IR controller of claim 1, wherein the control unit further functions to:
   when the end of frame is detected, determine whether the IR frame includes an end of message;
   when the a pulse detection signal is not received for the next IR frame is received prior to the time out period and the IR frame does not include the end of message, generate an error message.

8. The IR controller of claim 1, wherein the control unit detects the end of frame of the IR frame by:
   initializing a bit count in response to the pulse detection signal;
   counting bits of the IR frame in accordance with a sample rate of the programmable IR decoding parameters to produce an accumulated bit count;
   comparing the accumulated bit count with a frame bit value; and
   when the accumulated bit count compares favorably with the frame bit value, indicating the end of the frame.

9. An infrared (IR) controller comprises:
   programmable decoder operably coupled to, when enabled, decode an IR frame in accordance with programmable IR decoding parameters to produce decoded data; and
   a control unit operably coupled to, when the IR controller is in a normal mode:
      enable the programmable decoder to decode the IR frame while the IR frame is being received;
      temporarily disable the programmable decoder after the IR frame has been received;
      determine whether another IR frame is received prior to expiration of a time out period;
      when the another IR frame is received prior to expiration of the time out period, enable the programmable decoder to decode the another IR frame; and
   when the IR controller is in a proprietary mode, enable the programmable decoder to pass the IR frame for a duration of a proprietary time out period to produce raw data.

10. The IR controller of claim 9, wherein the control unit further functions to enable the programmable decoder to decode the IR frame while the IR frame is being received by:
    detecting a start of the IR frame;
    enabling the programmable decoder in response to the detecting the start of the IR frame; and
    detecting an end of the IR frame, wherein from the start of the IR frame to the end of the IR frame, the IR frame is being received.

11. The IR controller of claim 10, wherein the control unit further functions to temporarily disable the programmable decoder by:
    providing a disable signal to the programmable decoder in response to the detecting the end of the IR frame.

12. The IR controller of claim 11 further comprises:
    a timer circuit operably coupled to produce the time out period in accordance with at least one of the start of the IR frame and the end of the IR frame and to produce the proprietary time out period based on at least one a negotiated data rate, a negotiated data length, and a negotiated start of the proprietary time out period.

13. An Infrared (IR) receiver comprising:
    a programmable decoder having a normal mode of operation and a proprietary mode of operation, wherein:
       when in the normal mode of operation, the programmable decoder decodes frames of an IR data transmission to produce decoded data, and
       when in the proprietary mode of operation, the programmable decoder passes data of the IR data transmission during a time out period to produce raw data; and
    a timer circuit that generates the time out period in response to the pulse detection signal.

14. The IR receiver of claim 13, further comprising:
    a pulse detection circuit that generates a pulse detection signal in response to detecting the IR data transmission; and
    a buffer to store the decoded data and the raw data.

15. The IR receiver of claim 13, wherein the timer circuit generates the timeout period based on negotiation between the IR receiver and a separate IR transmitter when the IR receiver is operating in the proprietary mode.

16. The IR receiver of claim 13, wherein the raw data comprises:
    a beginning of transmission data word and a data stream, wherein the beginning of transmission data word includes a length of the data stream and a rate of the data stream.

17. The IR receiver of claim 13 further comprises:
    a control unit, wherein. when the programmable decoder is in the normal mode, the control unit functions to:
    determine whether the frames of the IR data transmission are continuous or non-continuous;
       when the frames of the IR data transmission are non-continuous, enable the programmable decoder at a start of one of the frames of the IR data transmission;
       detect an end of frame of the one of the frames of the IR data transmission;
       when the end of frame is detected, temporarily disable the programmable decoder;
       initiate the timer circuit to produce a second time out period in response to the end of frame;
       determine whether another one of the frames of the IR data transmission is received prior to expiration of the second time out period; and
       when the another one of the frames of the IR data transmission is received prior to expiration of the second time out period, enable the programmable decoder to decode the another one of the frames of the IR data transmission.

* * * * *